Aug. 7, 1934.    E. J. DE WITT    1,969,122
CONVEYER SYSTEM
Filed Nov. 1, 1930    3 Sheets-Sheet 1

Inventor
Edward James DeWitt
By Arthur H. Watson Atty.

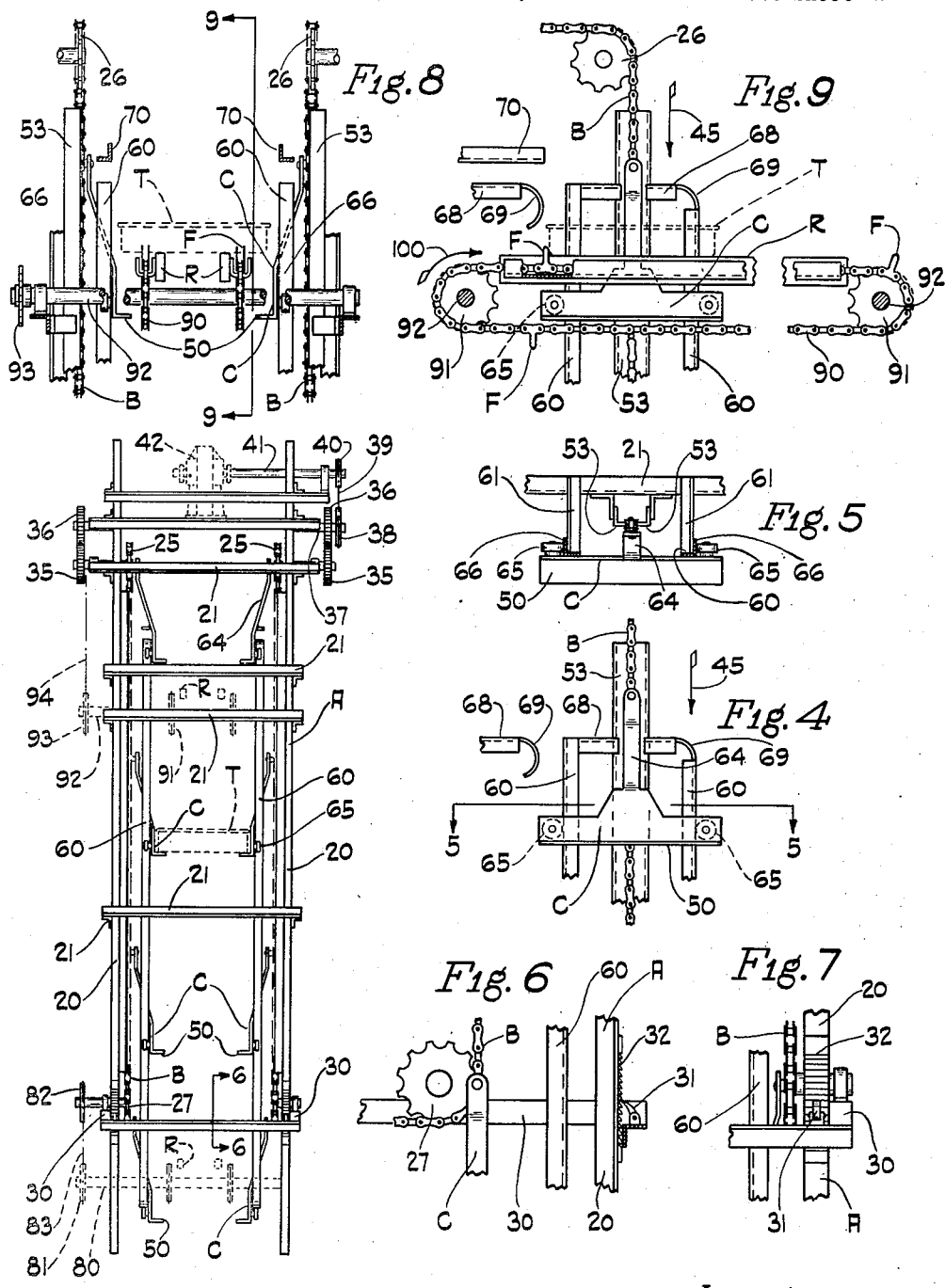

Patented Aug. 7, 1934

1,969,122

UNITED STATES PATENT OFFICE 1,969,122

CONVEYER SYSTEM

Edward James De Witt, Lake Forest, Ill.

Application November 1, 1930, Serial No. 492,659

1 Claim. (Cl. 198—20)

My invention relates to improvements in conveyer systems and more particularly to that type of conveyer system wherein objects are to be conveyed between spaced apart horizontal levels.

An object of the invention is to provide an improved conveyer system.

Another object is to provide a conveyer system wherein the ascension and descension of objects, as to and from an upper level, is a continuous function of the same object supporting carriers, in continuous motion.

A further object is to provide a conveyer system in which that space between the opposite and horizontally aligned series of object supporting carriers is entirely free of interconnecting members throughout the continuous and endless path thereof. This feature greatly aids in the loading and unloading of the carriers.

Another object is to provide a conveyer system wherein the object supporting carriers are held non-yieldingly in horizontal position during their complete cycle of movement vertically and during the horizontal cross over.

A further object is to provide a conveyer system wherein loading and unloading to and from the respective vertically ascending and descending carriers may be done entirely within a horizontal plane.

Another object is to provide a conveyer system in which loading may be done on one side and unloading and reloading accomplished on the other, thus performing the duties of two conveyers of the type at present available.

A further object is to provide a conveyer system having an automatic take-up for preventing the occurrence of lost motion as between the series of object supporting carriers.

Another object is to provide a conveyer system which is relatively simple in structure, which will operate smoothly to bear the most delicate burden and which may be manufactured at relatively low cost.

Other objects and advantages will hereinafter appear in the following specification and appended claim.

One embodiment of my invention is illustrated in the accompanying drawings forming a part of this specification, wherein Fig. 1 is a vertical sectional view of my improved conveyer along the line 1—1 of Fig. 2;

Fig. 3 is a side elevation of the conveyer as shown in Fig. 1;

Fig. 4 is a fragmentary elevation of a part of the conveyer;

Fig. 5 is a sectional view along the line 5—5 of Fig. 4;

Fig. 6 is an enlarged sectional view along the line 6—6 of Fig. 3;

Fig. 7 is a side elevation of the mechanism shown in Fig. 6;

Fig. 8 is an end elevation partially in section of mechanism for unloading the conveyer;

Fig. 9 is a view along the line 9—9 of Fig. 8; and

Figure 2:
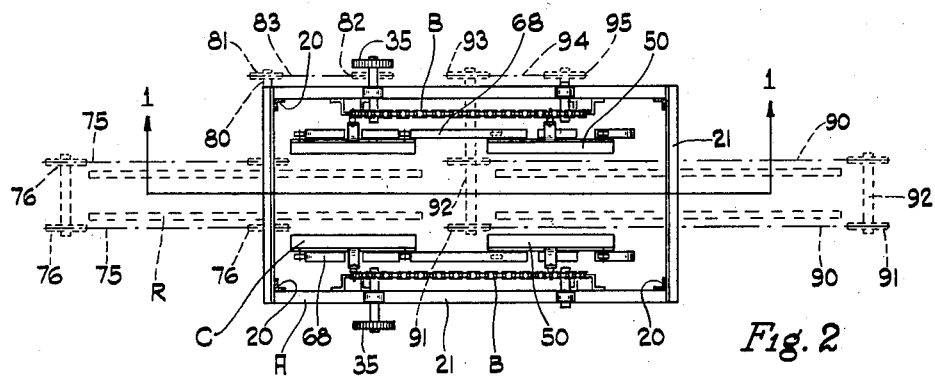
Fig. 2 is a horizontal full sectional view along the line 2—2 of Fig. 1.

In general, the conveyer system selected for illustration herein comprises an open upright frame A rectangular in horizontal section, within which a pair of endless link chains B are mounted for linear motion, each chain being arranged in rectangular form in a plane parallel to and adjacent one end wall of the frame, means for synchronizing the movement of the chains, a plurality of object supporting carriers C arranged in registering pairs pivotally secured to the opposite sides of the chains B, and mechanism for guiding said object supporting carriers C to maintain them positively in unerringly upright positions throughout their entire course of travel. Loading and unloading apparatus generally indicated in dotted lines in Fig. 1 coordinately functions with the foregoing mechanism to load and unload the conveyer as hereinafter described.

The frame A is constructed of four upright angle irons 20 of a height determinable by the elevation to which the conveyer is to be used. This may be from one to the next or several floor levels above of the building within which the conveying system is in use. Horizontal cross members 21 make up the balance of frame A and lend rigidity to the entire structure.

Each of the pair of chains B is mounted upon four sprockets 25, 26, 27 and 28 carried upon inner and opposite sides of the frame A, the sprockets 25 and 26 having their shafts journalled upon cross pieces 21 of the frame while the sprockets 27 and 28 are similarly mounted upon heavy cross bars 30 (see Figs. 6 and 7) which by their weight keep the chains tight. By this arrangement the chains at the upper horizontal cross-over are held taut to assure proper increment of the carriers with respect to their guides as hereinafter explained.

Pawls 31 associated with the cross bars are arranged to engage with ratchet toothed racks 32 secured to the frame to thus maintain the chains taut when drawn so by the cross bars.

Each of the sprockets 25 has its shafts extended outwardly of the frame A and carries gears 35 thereupon. The gears 35 mesh with similar gears 36 upon opposite ends of a shaft 37 journalled upon the frame A above the chains B. This shaft and its gears 36 serve to permanently interconnect the pair of chains so that they move in synchronism. The shaft 37 has a sprocket 38 which is interconnected by a drive chain 39 to a sprocket 40 secured to the driven shaft 41 of an electric motor drive unit 42 which, when set in motion, may drive the chains in the direction of the arrows 45.

The chains B are of the link type, as best shown in Figs. 5, 6 and 7, and each has a plurality of spaced apart object supporting carriers C pivotally suspended thereupon, the pivots forming a part of the interconnecting chain link pins.

The carriers C are fashioned in the shape of an inverted T and are mounted on the opposed faces of the chains B so as to register in opposite pairs. These carriers C are further formed with horizontally and laterally extending flanges 50 at their lower edge so that a shelf or tray may be supported upon and between the flanges of the opposed pair of carriers.

Figure 1:
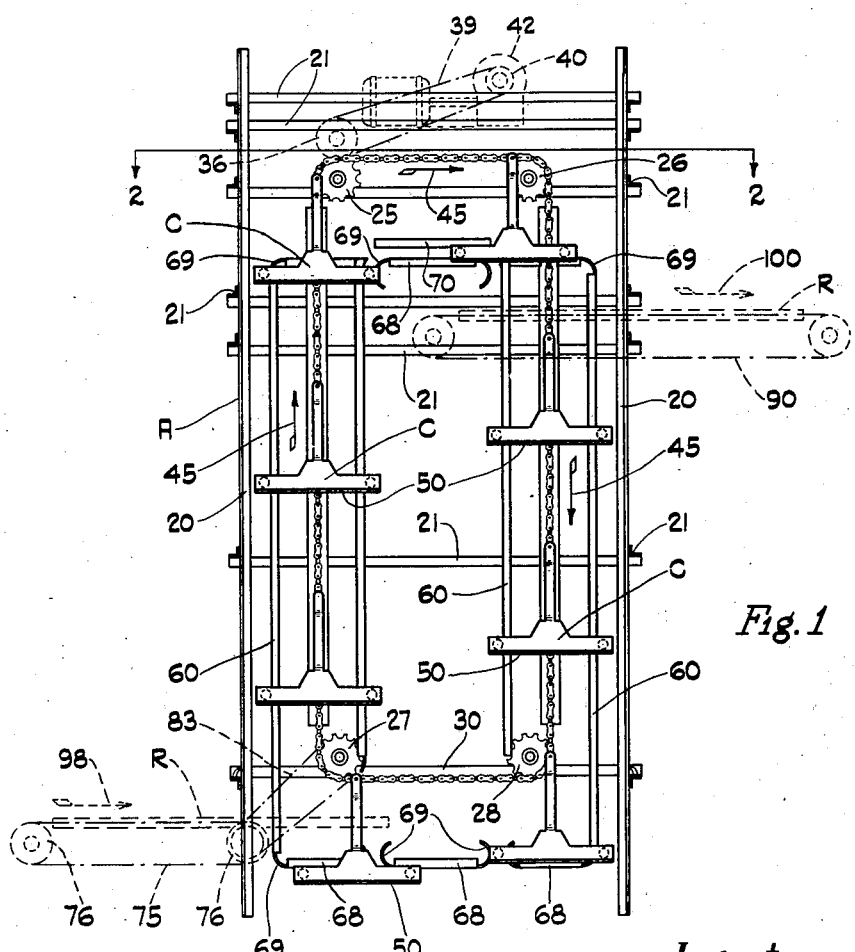

With reference to Figs. 1 and 2, it will be seen that the chains B are confined in their vertical movements against lateral displacement in any direction by elongated tracks including vertically spaced angle pieces 53 (see Fig. 5), the edges of which extend between the outer plates of the chain links so that the chain is held against all but vertical movement. The pivotal supports of the carriers C are thus guided during the ascent and descent of the carriers.

Additional structure operating to still further maintain the carriers in their intended operative positions consists in pairs of spaced apart rails 60 extending vertically, one of each pair at opposite ends of the lower portions of the carriers. These rails 60 may be of angle iron secured to the frame A by plates 61 (see Fig. 5).

The rails are spaced slightly away from the chain and chain guides B and 53, respectively, and so that carriers may slide flat against the rails the upper part of the carriers are off-set as shown at 64. Rollers 65 are mounted at the remote ends of the carriers where they contact the rails 60 at the outer faces or sides 66 (see Fig. 5). This arrangement holds the carriers with their tray or load supporting flanges 50 in horizontal position regardless of the disposition of the load.

Means for maintaining the horizontal position of the carriers C during the cross-over or horizontal movement at the top and bottom of the conveyer consists of single cross rails 68, three of which are at the top and three of which are at the bottom arranged in longitudinal alignment. Of the upper three the outer two serve to join the rails 60 at their upper ends, while the center one is spaced apart from the remaining two by a distance sufficient to admit the adjacent roller 65 of the carrier as it passes from vertical to horizontal movement and vice versa. At the lower ends of the rails 60 the single rails 68 are arranged much the same as are these for the top cross-over except the inner of the rails 60 do not reach down to engage with the adjacent single rails 68.

To facilitate movement of the carriers to and from the cross-over the ends of the center rail 68 are curved to follow the curve of the chain B over its near sprocket and the remote ends of the outer two rails 68 are likewise so formed, the curved portion being indicated at 69.

As an additional precaution a horizontal guide 70 is disposed over the center of the upper rails 68 as the carriers are presumed to be loaded when crossing over at the top.

Mechanism for loading the conveyer at its low level is shown in dotted lines in Figs. 1 and 2. In brief, the mechanism comprises conveyer chains 75 riding upon sprockets 76, certain of the links of which have outwardly extending attachment links forming fingers F (as in the chain shown in Fig. 9) which may engage with and push the object on tray T along its supporting runners R until the object or tray can move no further by virtue of the disengagement of the fingers F therefrom as the chain moves over the inner sprockets 76. The object or tray is then in a position so that the next succeeding pair of carriers C will engage and lift it upon their flanges 50 to be carried to its destination. The inner sprockets 76 are fixed to a shaft 80, upon which a third sprocket 81 is mounted. The sprocket 81 is connected by a drive chain 83 to a sprocket 82 mounted upon the shaft of the adjacent sprocket 27 for the chain B. Thus the loading device is synchronized with the conveyer proper.

In Figs. 8 and 9 I have shown in detail a similar device for unloading the conveyer as at an upper level. This device, as in the case of the loading apparatus, comprises a pair of conveyer chains 90 which ride upon sprockets 91 carried upon shafts 92. The innermost of the shafts 92 has a third sprocket 93 thereupon which is driven by a chain 94 which derives its power from a sprocket 94 keyed upon the shaft of the adjacent sprocket 26.

In operation, my improved conveyer system performs all of the duties of a multiplex conveyer of the present known type employing no less than three endless driven chains or belts to elevate, cross over and lower the loads imposed.

The total absence of interconnecting structure between the opposed chains B or carriers C makes possible the introduction of a simple load extracter therebetween for receiving the trays or load thereupon as the carriers descend and continue on their downward journey. As heretofore described, the mechanism for extracting the load may be of unusually simple structure consisting merely of a pair of chains riding upon supporting sprockets, the entire assembly being stationary as differentiated from the more complex and troublesome compound reciprocal extracting apparatus necessarily employed on present known conveyers for like purposes where a cross-over of the load cannot be carried out. It will be noted that I provide for the cross-over of the load from ascent to descent without extraneous means.

A load such as a tray T which may contain objects to be elevated to an upper level, is placed upon the loading chains 76 which move as shown by the arrow 98 to push the tray along its runners R where it will stop directly in the path of the next ascending pair of carriers C which, in passing about the runners, will engage with and lift the tray upon their horizontally extending flanged portions 50. In ascending the tray will be held horizontally despite any one sided arrangement of its load because of the rails 60 and chain guides 53. When the carriers C bearing the tray have arrived at the top of the conveyer the carriers will follow the chain B on the cross-over in the direction of the arrow 45 and during this travel be guided and held horizontally by the rails 68 and upper guide 70 assisted by the extremities of the rails 60.

At the end of the cross-over the carriers guided by the chain and curved portion 69 of the rails 68 will start the descent along the rails 60 at the remote side of the conveyer where the tray may be stopped by the runners R of the unloading device, allowing its carriers to proceed downwardly. The chains 90 will now draw the tray away in the direction of the arrow 100 where it may be deposited as desired or removed from the chains 90 by an attendant.

If desired, trays or other loads may be placed upon the carriers at any level beneath the unloading device described, thus increasing the usefulness of the conveyer.

Figure 10:
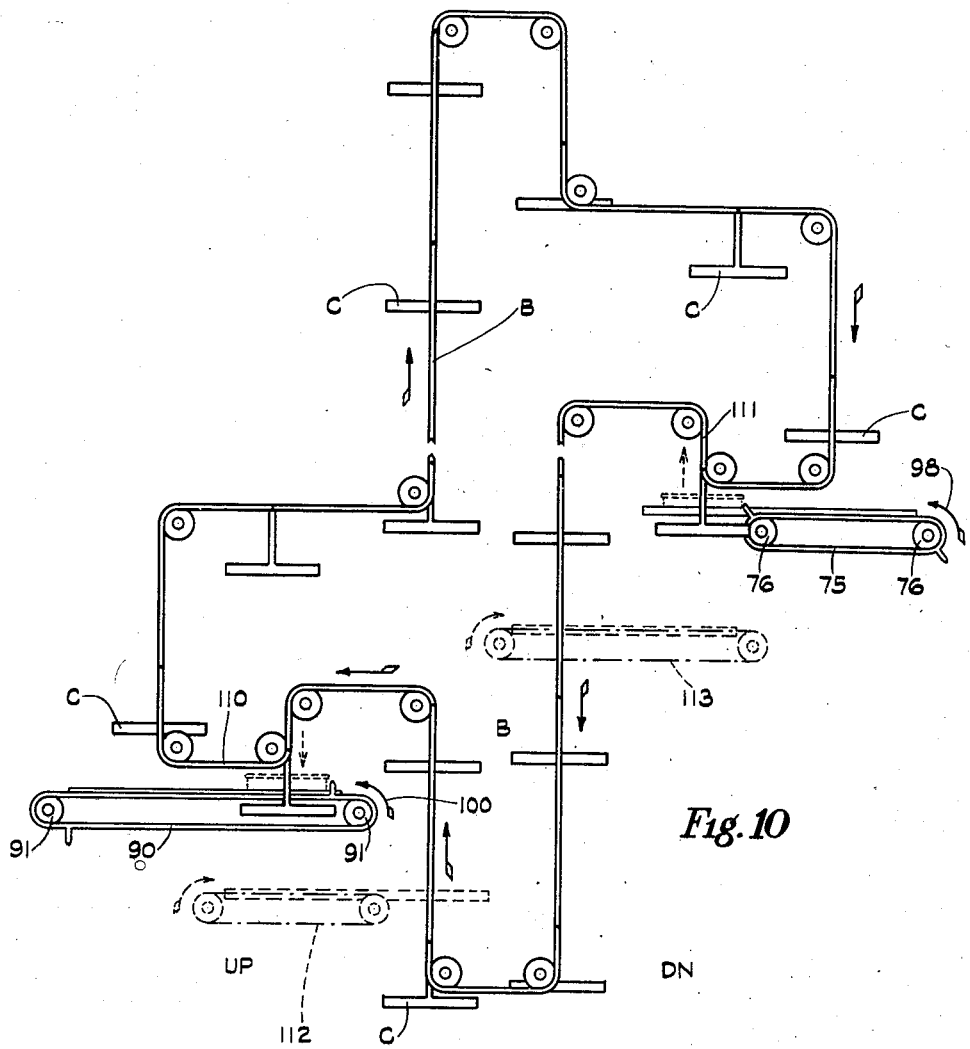
Fig. 10 is a diagrammatic view of a modified form of the conveyer.

In Fig. 10 I have shown a schematic lay-out of my improved conveyer system, the parts being so arranged as to permit both loading and unloading on either side thereof. It has been explained heretofore that loading may be done during the upper movement of the carriers C and unloading during the downward movement of the carriers. Normally the carriers travel up (see Fig. 10) and down on the other side DN.

I provide for loading on the up side by momentarily causing the carrier C to descend as at 110, using such unloading mechanism as is shown in Fig. 9. Conversely, I provide for the loading on the down side of the conveyer by causing the carriers to momentarily ascend as at 111, using such loading apparatus as described and illustrated in dotted lines in Fig. 1. In Fig. 10 loading and unloading apparatus is represented also at 112 and 113, respectively, completing an installation such as required to load and unload on both sides of the conveyer, one cycle being performed as the carriers go up and another as the carriers move down.

Having thus described my invention, what I claim and desire to secure by United States Letters Patent is as follows:

In a conveyer system for transferring loads between different horizontal levels, a flexible endless conveyer composed of spaced parallel conveyer members disposed over guide and driving pulleys and adapted to be driven in synchronism with no transverse connection therebetween, said conveyer being reversely directed for a short distance in both its up side and down side, load engaging carriers complementally disposed on each said parallel conveyer members and having no transverse connection, load receivable supports extending across the axis of travel at both the up side and down side of the system and including spaced parallel runners disposed adjacent the points in the system whereat the conveyer members resume their normal directional travel after reversal, said conveyer members being arranged to move the load carriers longitudinally of the runners and beneath the same and along the opposite external sides thereof, and means for conveying loads to and from said runners, said means being disposed and operable between said runners.

EDWARD JAMES DE WITT.